(12) United States Patent
Schweiger (10) Patent No.: US 7,597,285 B2
(45) Date of Patent: Oct. 6, 2009

(54) FLUID DYNAMICALLY EFFECTIVE SURFACE FOR MINIMIZING INDUCED RESISTANCE

(75) Inventor: Johannes Schweiger, Bad Heilbrunn (DE)

(73) Assignee: Airbus Deutschland GmbH, Hamburg (DE)

(*) Notice: Subject to any disclaimer, the term of this patent is extended or adjusted under 35 U.S.C. 154(b) by 446 days.

(21) Appl. No.: 10/543,037

(22) PCT Filed: Jan. 21, 2004

(86) PCT No.: PCT/DE2004/000093

§ 371 (c)(1),
(2), (4) Date: Jul. 21, 2005

(87) PCT Pub. No.: WO2004/065209

PCT Pub. Date: Aug. 4, 2005

(65) Prior Publication Data

US 2006/0049307 A1   Mar. 9, 2006

(30) Foreign Application Priority Data

Jan. 23, 2003   (DE) ................................ 103 02 514

(51) Int. Cl.
*B64C 13/00* (2006.01)
*B64C 19/00* (2006.01)

(52) U.S. Cl. ...................................... 244/75.1
(58) Field of Classification Search ............... 244/90 R, 244/91, 199.4, 75.1, 76 R, 201
See application file for complete search history.

(56) References Cited

U.S. PATENT DOCUMENTS 1,987,050 A   1/1935   Burnelli (Continued)

FOREIGN PATENT DOCUMENTS

DE   102 02 021   6/2003

(Continued)

*Primary Examiner*—Michael R Carone
*Assistant Examiner*—Valentina Xavier
(74) *Attorney, Agent, or Firm*—W. F. Fasse; W. G. Fasse (57) ABSTRACT

A fluid dynamically effective surface of a device moving in a fluid, especially a lifting surface of a flying machine, has an elastic axis extending in the span direction of the surface, and an adjustable control surface. The lifting surface is elastically deformable in a bending direction and/or in a torsion direction about the elastic axis, due to and dependent on the adjustment of the control surface, while changing the induced fluid dynamic drag. A control and/or regulating arrangement is provided for adjusting the control surface in the sense of minimizing the induced fluid dynamic drag of the lifting surface.

17 Claims, 9 Drawing Sheets

U.S. PATENT DOCUMENTS

| | | | |
|---|---|---|---|
| 2,418,301 A | 4/1947 | Heal | |
| 2,480,040 A | 8/1949 | Mitchell | |
| 2,802,630 A | 8/1957 | Birchill et al. | |
| 2,846,165 A | 8/1958 | Axelson | |
| 3,270,988 A | 9/1966 | Cone | |
| 4,172,574 A | 10/1979 | Spillman | |
| 4,455,004 A * | 6/1984 | Whitaker, Sr. | 244/90 R |
| 4,457,479 A | 7/1984 | Daude | |
| 4,598,885 A | 7/1986 | Waitzman | |
| 4,714,215 A | 12/1987 | Jupp et al. | |
| 4,722,499 A * | 2/1988 | Klug | 244/199.4 |
| 4,725,020 A | 2/1988 | Whitener | |
| 5,082,207 A | 1/1992 | Tulinius | |
| 5,275,358 A * | 1/1994 | Goldhammer et al. | 244/91 |
| 5,348,253 A * | 9/1994 | Gratzer | 244/91 |
| 5,681,014 A | 10/1997 | Palmer | |
| 5,988,563 A * | 11/1999 | Allen | 244/49 |
| 6,142,738 A * | 11/2000 | Toulmay | 416/228 |
| 6,161,801 A | 12/2000 | Kelm et al. | |
| 6,345,790 B1 | 2/2002 | Brix | |
| 6,394,397 B1 | 5/2002 | Ngo et al. | |
| 6,484,968 B2 * | 11/2002 | Felker | 244/91 |
| 6,827,314 B2 | 12/2004 | Barriety | |
| 7,275,722 B2 | 10/2007 | Irving et al. | |
| 7,316,371 B2 | 1/2008 | Wyrembek et al. | |

FOREIGN PATENT DOCUMENTS

| | | |
|---|---|---|
| DE | 103 13 290 | 10/2004 |
| EP | 1 375 342 | 1/2004 |
| GB | 1086938 | 10/1967 |

* cited by examiner

FLUID DYNAMICALLY EFFECTIVE SURFACE FOR MINIMIZING INDUCED RESISTANCE

FIELD OF THE INVENTION

The invention relates to a fluid dynamically effective surface of a device moving in a fluid, especially a flying machine, especially a supporting or lifting surface of a flying machine, whereby the surface comprises an elastic axis extending in the span direction of the surface and an adjustable control surface.

BACKGROUND INFORMATION

In connection with a device moving in a fluid, there arises during the movement through the fluid, thus perhaps in connection with a flying machine during flight, a deformation of the fluid dynamically effective surface, thus of the lifting surface of the flying machine. This deformation is variable or changeable and depends on the effective aerodynamic forces and the inertial and/or mass forces. These are dependent on the flight condition (speed, altitude), as well as on the loading condition (useful payload, fuel quantity, position of center of gravity). Without special measures, a wing can only be designed so that it comprises the deformation that is most advantageous for the aerodynamic resistance or drag only for a single condition and time point of a flight. A different deformation, which is not drag-minimal, arises for every other condition and for every other time point.

In the state of the art, no systems have previously become known, with which the structural deformation of wings can be adapted or matched to a form or shape that is optimal for the aerodynamic resistance or drag. The influence of the structural deformation was either neglected or disregarded, simply put up with, or in the best case taken into consideration such that the deformation that is most advantageous for the aerodynamic drag arises for an "average" flight condition (average loading, half flight time).

While, of course, control surfaces that are per se adjustable are known on such fluid dynamically effective surfaces such as the lifting surface of a flying machine, these, however, serve for the control of the flight attitude or the trimming of the aircraft, but not, however, a change or variation of the deformation of the wing in the sense of an adaptation or matching to the form that is most advantageous for the aerodynamic drag dependent on the flight and loading condition. It is also known, to use conventional control surfaces on the wing trailing edge (aileron) for influencing the aerodynamic pressure distribution for a smaller structural loading (load reduction), a similar control surface concept has also become known for improving the roll control for an experimental version of a combat aircraft, similarly also for the same purpose the additional use of flaps along the wing leading edge.

The aerodynamic pressure distribution and the structural loading change or vary due to differing flight conditions (altitude, speed) and loading conditions (useful payload, fuel, position of center of gravity), whereby different elastic deformations arise. This deformation condition influences the aerodynamic (lift induced) resistance. For a given span, and without consideration of the structural loading, the minimal resistance arises for an elliptical aerodynamic pressure distribution over the span. This can be achieved through an elliptical wing plan form or through a corresponding torsion or twisting of the wing profile chord in the span direction relative to the direction of incident flow or relative wind. A wing torsion deformation in the span direction (twisting) as well as a bending deformation on the swept-back wing influence this distribution. Therefore, the drag-minimizing deformation condition can only prevail for a short time during the total duration of a flight, in which the fuel quantity changes and the flying proceeds with different speeds at different altitudes. Moreover, the magnitude of the deformation is dependent on the loading condition.

SUMMARY OF THE INVENTION

The object of the invention is to present a fluid dynamically effective surface of a device moving in a fluid, especially a flying machine, especially a lifting surface of a flying machine, which comprises a deformation that is most advantageous for a minimal fluid dynamic drag, to the extent possible for every condition.

The above object has been achieved through the invention whereby there is provided a fluid dynamically effective surface of a device moving in a fluid, especially a flying machine, especially a lifting surface of a flying machine. The surface comprises an elastic axis extending in the span direction of the surface, and an adjustable control surface. According to the invention it is provided that the surface is elastically deformable in the bending direction and/or in the direction about the elastic axis, dependent on the adjustment of the control surface, in connection with change of the induced fluid dynamic drag and that a control and/or regulating device for adjusting the control surface in the sense of a minimization of the induced fluid dynamic drag of the surface is provided. A significant advantage of the inventive fluid dynamic surface is that a distribution of the lift force over the wing span, which distribution is optimal for the drag or resistance, can be produced for practically every flight and loading condition. For the lifting surface of an aircraft this means that an adaptation of the deformation can be achieved for practically every flight condition through the invention. Moreover, the invention can be used to advantage for additional functions, such as the support or assistance of the roll control, a load reduction, an improvement of the flutter stability, and a use for the stabilization and/or control of the lateral movement about the aircraft vertical axis, in case the plane of the control surface comprises a vertical component.

Preferably, the control surface is arranged offset by a prescribed spacing distance relative to the elastic axis.

Preferably the control surface is arranged supported rotatably about a rotation axis, and the rotation axis or at least a component thereof extends in the direction of the elastic axis.

According to an embodiment of the invention, the control surface can be arranged by a prescribed spacing distance behind the elastic axis.

According to a preferred embodiment of the invention, the control surface is arranged by a prescribed spacing distance in front of the elastic axis. The mounting of the control surface in front of the elastic axis means that the wing deformation supports or assists the desired aerodynamic force effect, while the aerodynamic force from the deformation acts contrary to the desired direction in connection with a position of the control surface behind the elastic axis.

According to an embodiment of the invention, the control surface can be arranged within the wing span.

According to a different embodiment of the invention, the control surface can be arranged outside of the wing span. This achieves an effective enlargement of the wing span.

According to an embodiment of the invention, the control surface can be arranged behind the leading edge of the surface.

According to a different preferred embodiment, the control surface can be arranged in front of the leading edge of the surface. This achieves an enlargement of the lever with which the control surface acts relative to the elastic axis.

According to a preferred embodiment of the invention, the control surface can be provided in addition to a wing tip surface (winglet) on the surface end or tip.

According to a different preferred embodiment of the invention, the control surface itself can be embodied as a wing tip surface (winglet).

In this regard it is advantageously provided that the rotation axis of the control surface forming the wing tip surface extends slopingly or obliquely relative to the direction of the elastic axis.

In the two just-mentioned embodiments, the surface is advantageously especially a lifting wing of a flying machine, whereby the wing tip surface (winglet) continues the lifting wing at its end, sloping obliquely or extending vertically upwardly.

In this regard, the surface is especially a lifting wing of a flying machine, whereby the wing tip surface (winglet) continues the lifting wing, sloping obliquely or extending vertically upwardly, and the control surface continues the lifting wing in its direction or continues the lifting wing sloping obliquely downwardly. In combination with the winglet, the control surface results in a second wing tip, whereby two edge or tip vortices are formed, which similarly contributes to the reduction of the induced resistance or drag.

According to preferred embodiments and applications of the invention, the surface is the lifting surface of an aircraft.

Alternatively, the surface can be the lifting surface of a rotary wing aircraft.

According to an advantageous embodiment of the invention, a control arrangement is provided, which produces an adjusting or actuating signal for the control surface from data relating to the aircraft loading and the flight condition, while using stored desired or nominal value data or comparison data.

According to a different advantageous embodiment of the invention, a regulating arrangement is provided, which produces an adjusting or actuating signal for the control surface by comparison of measured data, for example data measured in an optical manner, representing the actual elastic deformation of the fluid dynamically effective surface, with desired or nominal data representing a nominal or desired deformation of the fluid dynamically effective surface prescribed for the aircraft loading and the flight condition.

BRIEF DESCRIPTION OF THE DRAWINGS

In the following, example embodiments of the invention will be explained in connection with the drawings. It is shown by.

DETAILED DESCRIPTION OF PREFERRED EXAMPLE EMBODIMENTS OF THE INVENTION

Six different example embodiments of fluid dynamically effective surfaces, namely of lifting surfaces of an aircraft, are illustrated in the FIGS. 1 to 6. The surface 1 is respectively illustrated in a schematic perspective manner, and the direction of incident flow or relative wind during flight is indicated by a correspondingly designated arrow. The surface 1 has a span direction 6, which increases in the direction of the illustrated arrow beginning from the fuselage of the aircraft, which is not expressly illustrated. An elastic axis EA, about which the surface 1 is deformable in the torsional direction and in the bending direction, extends in the span direction 6 of the surface 1.

An adjustable control surface 3, which is respectively differentiated with 3a, 3b, 3c, 3d, 3e, 3f in the various example embodiments, is respectively provided on the surface 1.

For all of the example embodiments illustrated in the FIGS. 1 to 6, it applies that the surface 1 is elastically deformable in the bending direction and/or in the direction about the elastic axis EA, that is to say in the torsion direction, due to the aerodynamic forces effective during flight, dependent on the adjustment or setting of the control surface 3 while varying or changing the induced fluid dynamic drag. This elastic deformation is adjusted or set by a control and/or regulating arrangement such that the induced fluid dynamic drag of the surface 1 is minimized. The control and/or regulating arrangement will later still be explained in more detail.

Figure 4:
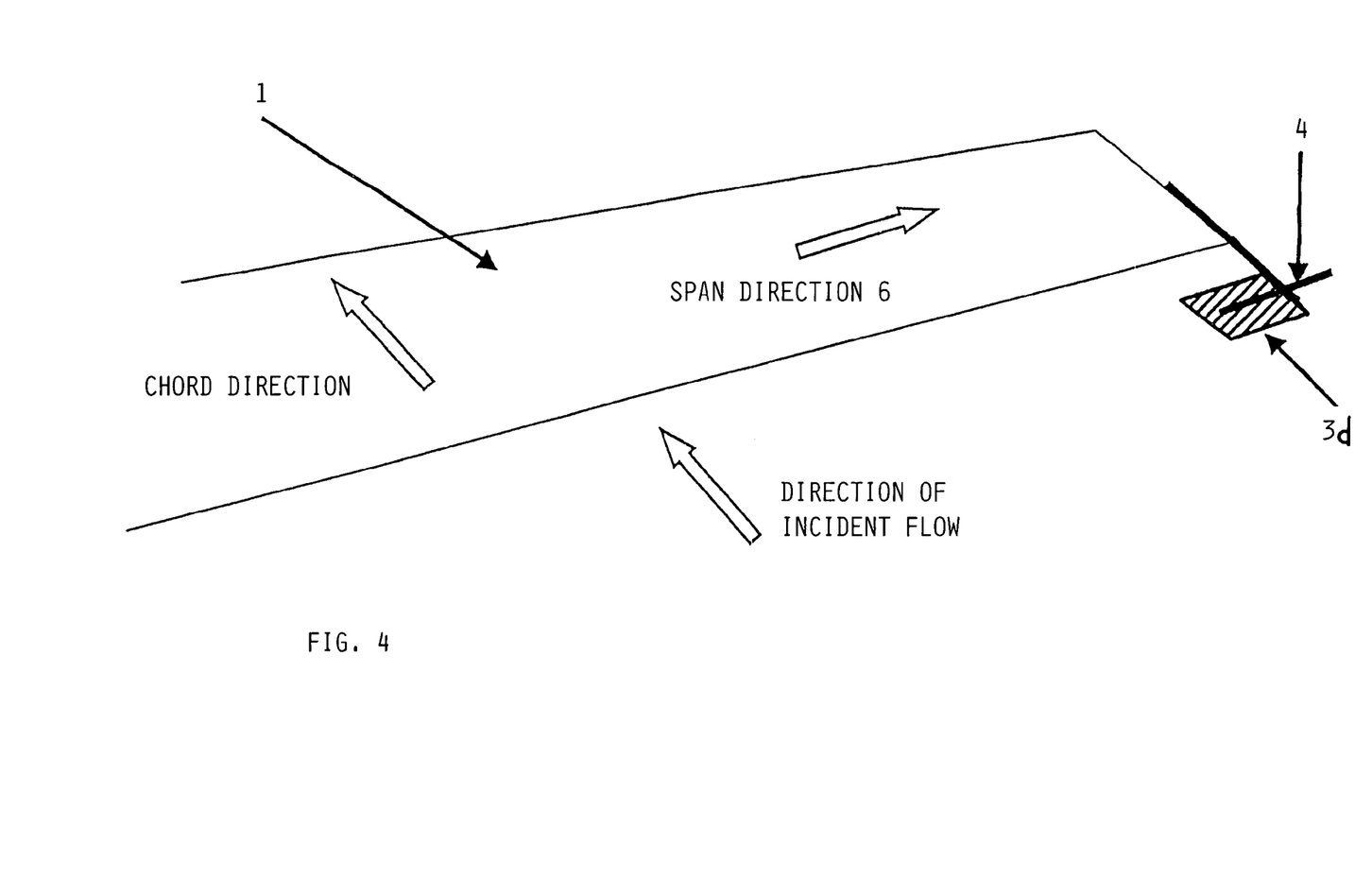
FIG. 4 a schematic perspective illustration of a lifting surface of an aircraft according to a fourth example embodiment of the invention.
Figure 5:
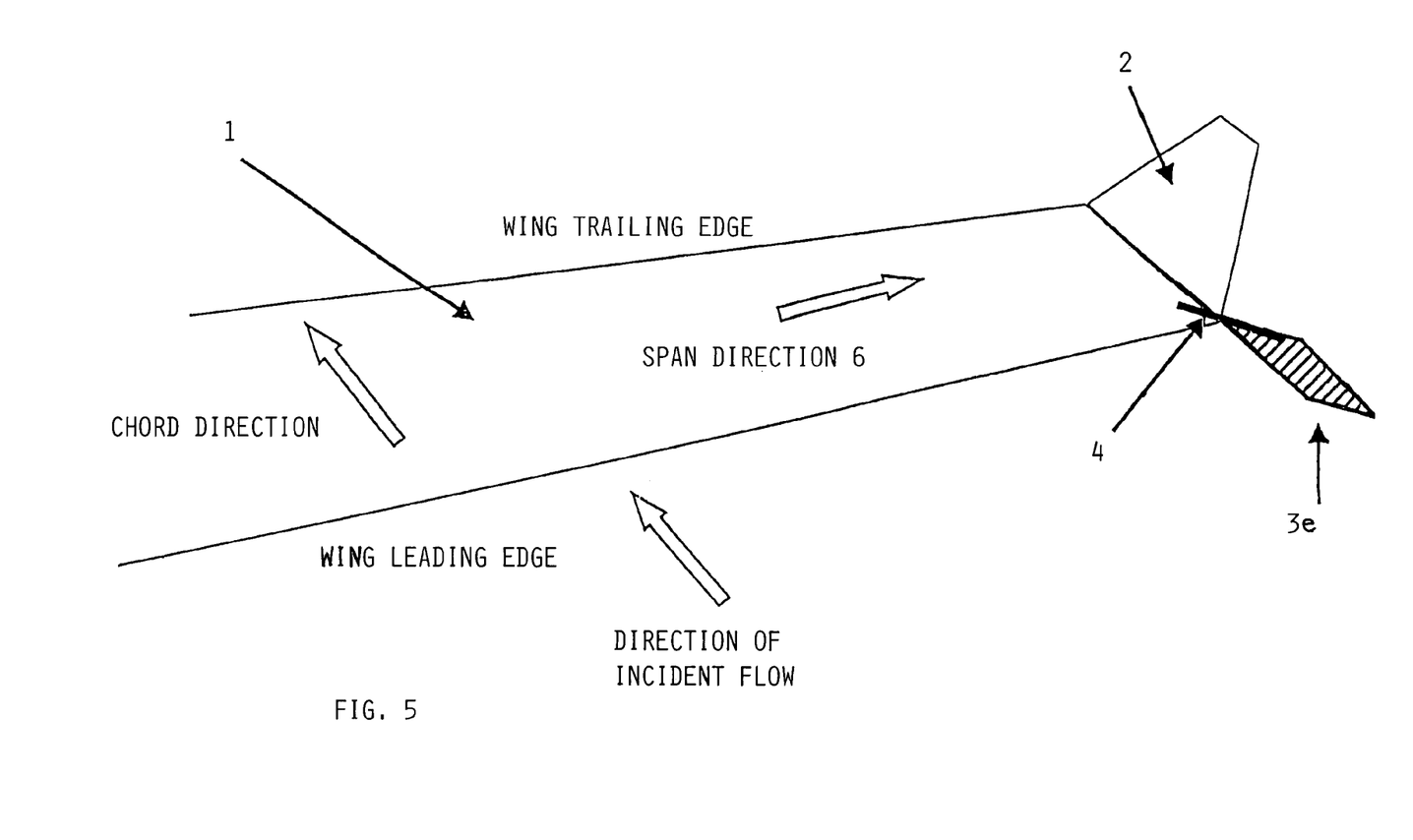
FIG. 5 a schematic perspective illustration of a lifting surface of an aircraft according to a fifth example embodiment of the invention.
Figure 6:
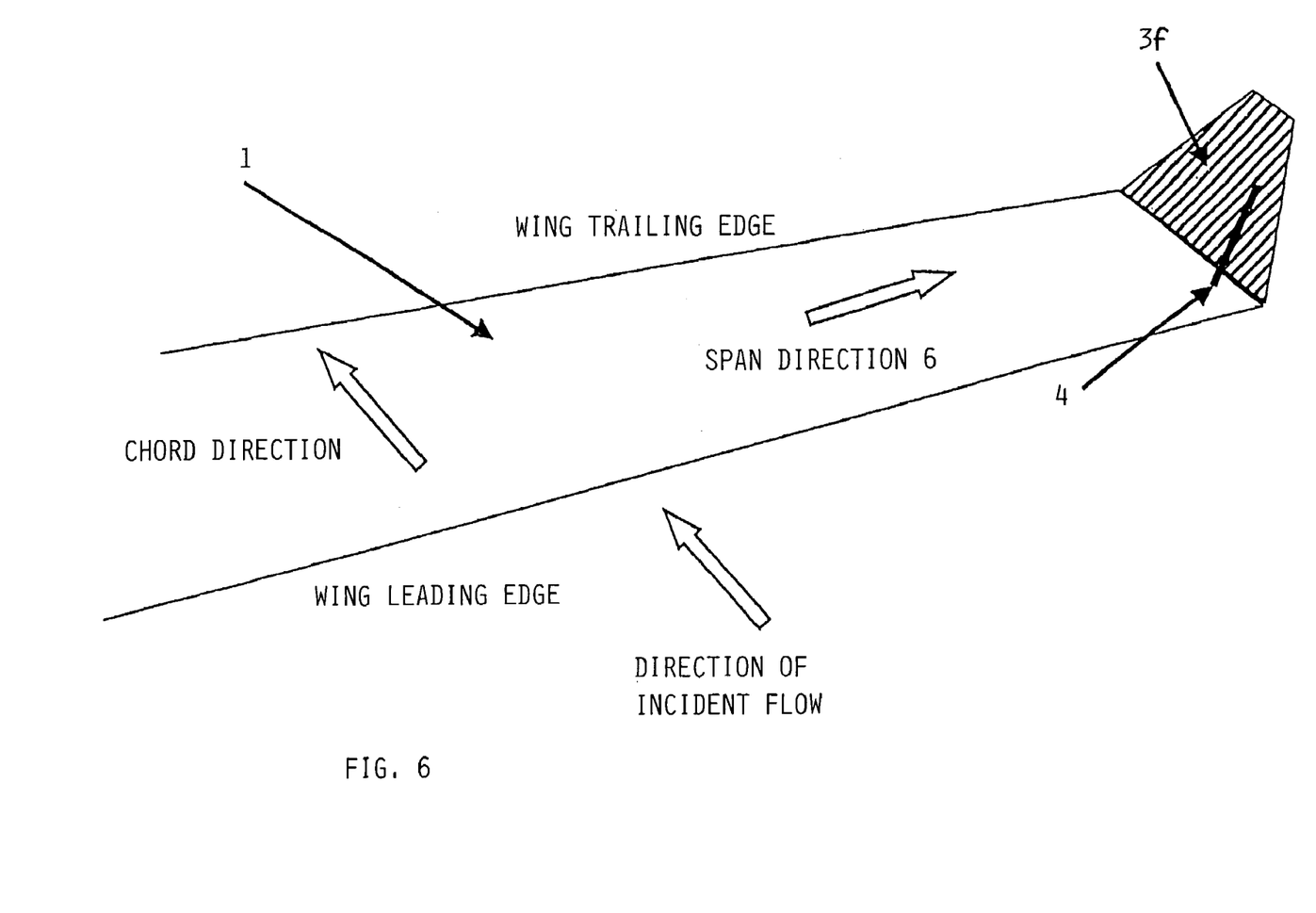
FIG. 6 a schematic perspective illustration of a lifting surface of an aircraft according to a sixth example embodiment of the invention.

The control surface 3 is arranged offset by a prescribed spacing distance relative to the elastic axis EA, as it is the case with the control surfaces 3a, 3b, 3c, 3d, 3e of the FIGS. 1 to 5, or it is at least arranged such that a readjustment of the control surface will lead to a change of the deformation of the surface 1 in the bending direction and/or in the direction about the elastic axis EA, as shown for the control surface 3f of the example embodiment of FIG. 6. (The elastic axis EA is illustrated only in the example embodiment of FIG. 1 for the sake of simplicity, it is, however, present in a similar manner in the remaining example embodiments).

Figure 3:
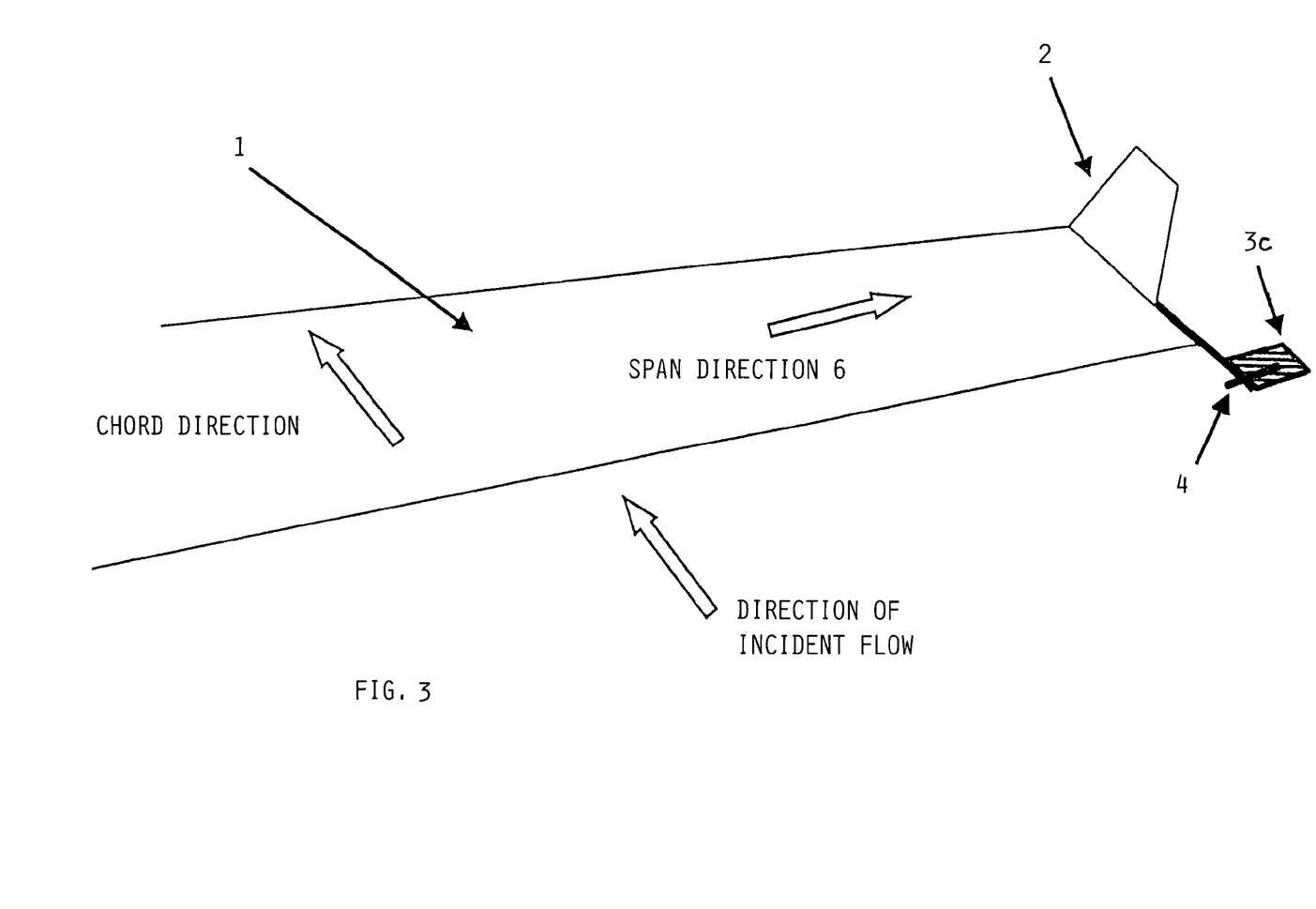
FIG. 3 a schematic perspective illustration of a lifting surface of an aircraft according to a third example embodiment of the invention.

In the example embodiments of the FIGS. 1 to 4, the control surface 3a, 3b, 3c, 3d is arranged rotatably supported about a rotation axis 4, whereby the rotation axis 4 extends essentially in the direction of the elastic axis EA; in the example embodiments of FIG. 5 and FIG. 6 the control surface 3e, 3f is arranged rotatably supported about a rotation axis 4 whereby a component of the rotation axis 4, namely the projection thereof onto the direction of the elastic axis EA, extends in the direction of the latter.

In the example embodiments of the FIGS. 1 to 5, the control surface $3a$, $3b$, $3c$, $3d$, $3e$ is arranged by a prescribed spacing distance in front of the elastic axis EA (relative to the direction of incident flow). As is easily understandable, this leads to the result that a deformation of the lifting surface 1 in the torsion direction about the elastic axis EA due to a readjustment of the control surface $3a$, $3b$, $3c$, $3d$, $3e$ involves an increase or amplification of the effect of the latter, so that the adjustment or setting of the control surface $3a$, $3b$, $3c$, $3d$, $3e$ is thus effective in a progressive self-amplifying manner, thus the control surface 3 must be less strongly readjusted. In contrast thereto, in example embodiments that are not illustrated here, the control surface 3 may also be arranged by a prescribed spacing distance behind the elastic axis EA (with respect to the direction of incident flow), which then contrarily leads to the result that a deformation of the surface 1 due to the adjustment of the control surface 3 has a weakening effect, so that the control surface 3 must be more strongly readjusted.

Figure 1:
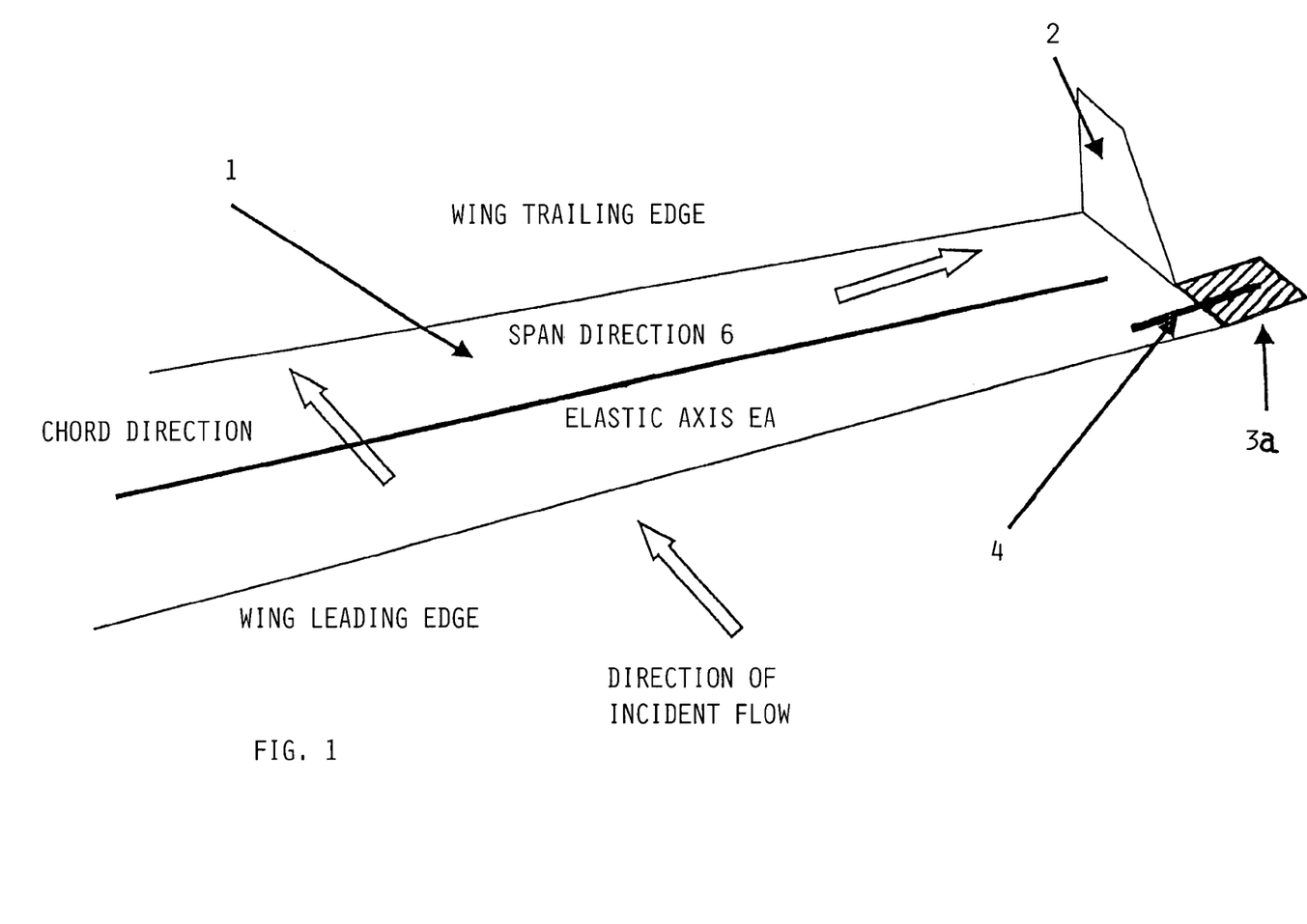
FIG. 1 a schematic perspective illustration of a lifting surface of an aircraft according to a first example embodiment of the invention.
Figure 2:
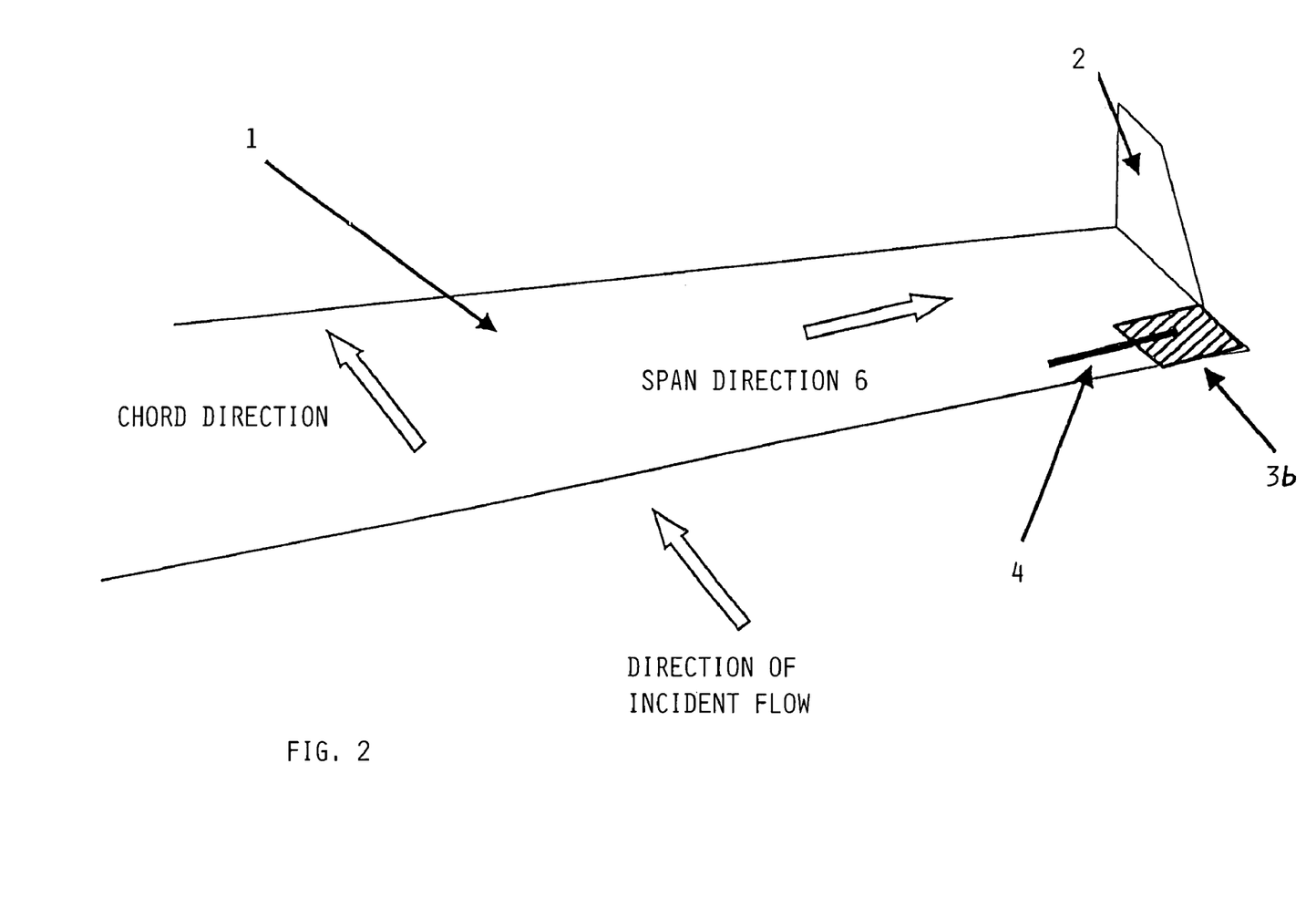
FIG. 2 a schematic perspective illustration of a lifting surface of an aircraft according to a second example embodiment of the invention.

In the example embodiments of FIG. 2 and FIG. 4, the control surface $3b$, $3d$ is arranged within the wing span, whereas in the example embodiments of the FIGS. 1, 3, 5 and 6 it is arranged outside of the wing span, compare the control surface $3a$, $3c$, $3e$, $3f$ in the above mentioned Figures. The latter manner of the arrangement thus leads to an effective enlargement of the wing span.

The control surface 3 can be arranged behind the leading edge of the surface 1, with respect to the direction of incident flow, as is the case with the control surfaces $3a$, $3b$ of the FIGS. 1 and 2, and in the broader sense also for the control surface $3f$ of the FIG. 6, which will later still be explained in more detail.

On the other hand, the control surface 3 can also be arranged in front of the leading edge of the surface 1, with respect to the direction of incident flow, as with the control surfaces $3c$, $3d$ of the FIGS. 3 and 4, and in the broader sense also for the control surface $3e$ of FIG. 5, which similarly will later still be explained.

The control surface 3 can be provided at the end or tip of the surface 1 additionally to a wing end or tip surface 2 (winglet), as is the case with the control surfaces $3a$, $3b$, $3c$, $3e$ of the FIGS. 1, 2, 3, and 5, or the control surface 3 can itself be embodied as a wing tip surface, as with the control surface $3f$ of FIG. 6. In the latter, the rotation axis 4 of the control surface $3f$ forming the wing tip surface 2 (seen in the vertical plane) extends obliquely relative to the direction of the elastic axis EA.

As can be seen, the wing tip surface (winglet) 2 continues the lifting wing or rather the surface 1 at its end obliquely or vertically upwardly in the example embodiments illustrated in the FIGS. 1, 2, 3 and 5. In the example embodiments of the FIGS. 1 to 4 the control surface $3a$, $3b$, $3c$, $3d$ continues the lifting wing or rather the surface 1 in the direction thereof or lies in the same, in the example embodiment of the FIG. 5 the control surface $3e$ continues the lifting wing 1 obliquely downwardly.

In the example embodiment of the FIG. 6, the control surface $3f$ itself forms the wing tip surface and continues the same in the direction obliquely upwardly.

Figure 7:
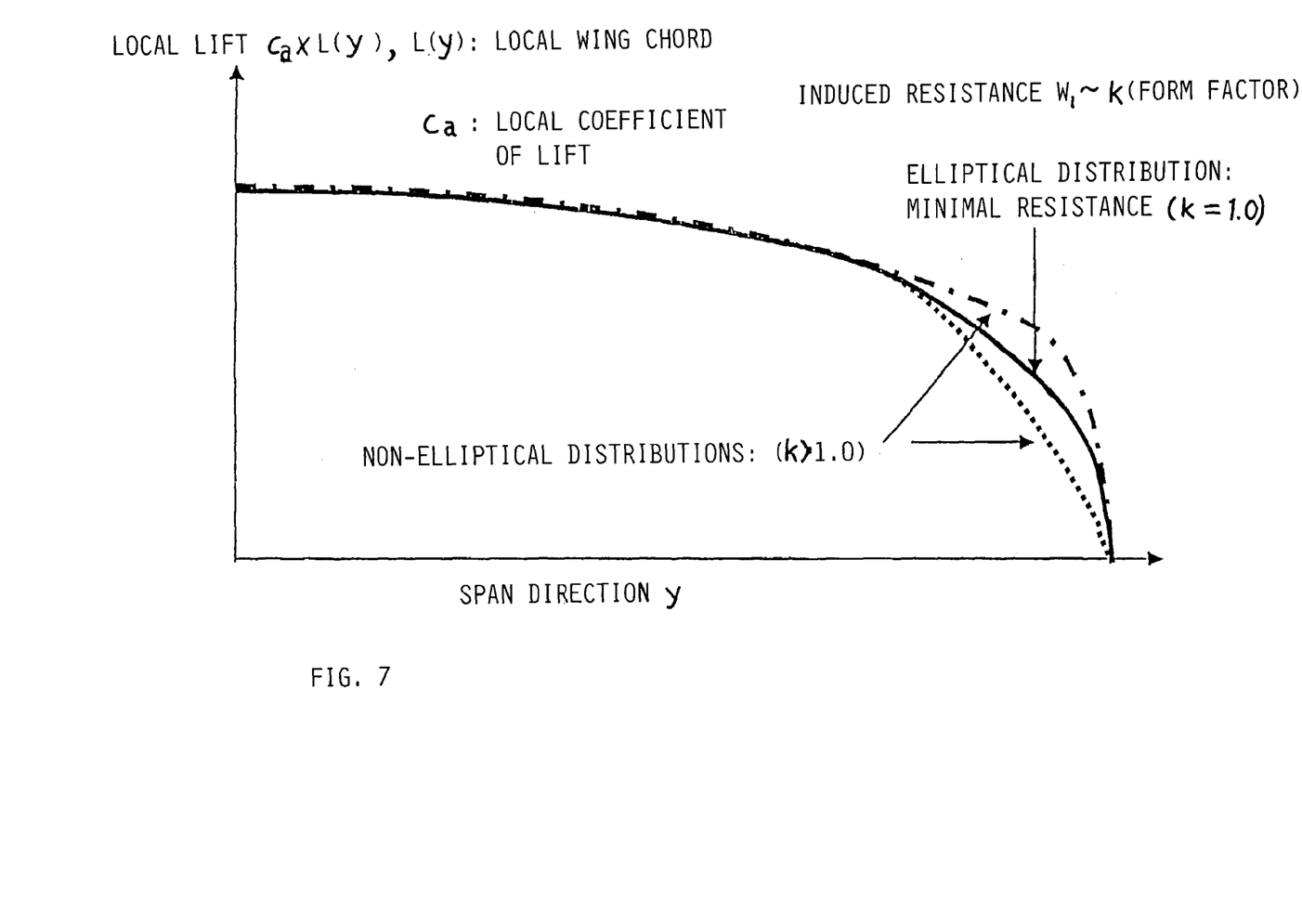
FIG. 7 a diagram, which represents the relationship between lift distribution and induced resistance or drag for the case of conventional lifting surfaces and for the case of a lifting surface according to example embodiments of the invention.

The diagram illustrated in FIG. 7 shows the relationship between the lift distribution and the induced resistance or drag over the span direction y. An elliptical distribution of the lift, which corresponds to a minimal induced aerodynamic drag, arises for a planar level wing with an elliptical plan form. With a non-elliptical plan form of the wing or rather the surface 1, a corresponding lift distribution can be achieved by different twisting or torsion of the wing profile chord relative to the direction of incident flow in the span direction. The same effect arises through different wing deformation conditions. Through the control surface 3, the elastic deformation can be adapted or matched to the minimal drag form. An elliptical distribution with minimal drag (k=1.0) is illustrated, and non-elliptical distributions (k>1.0) are also illustrated in a dotted and dash-dotted manner.

Figure 8:
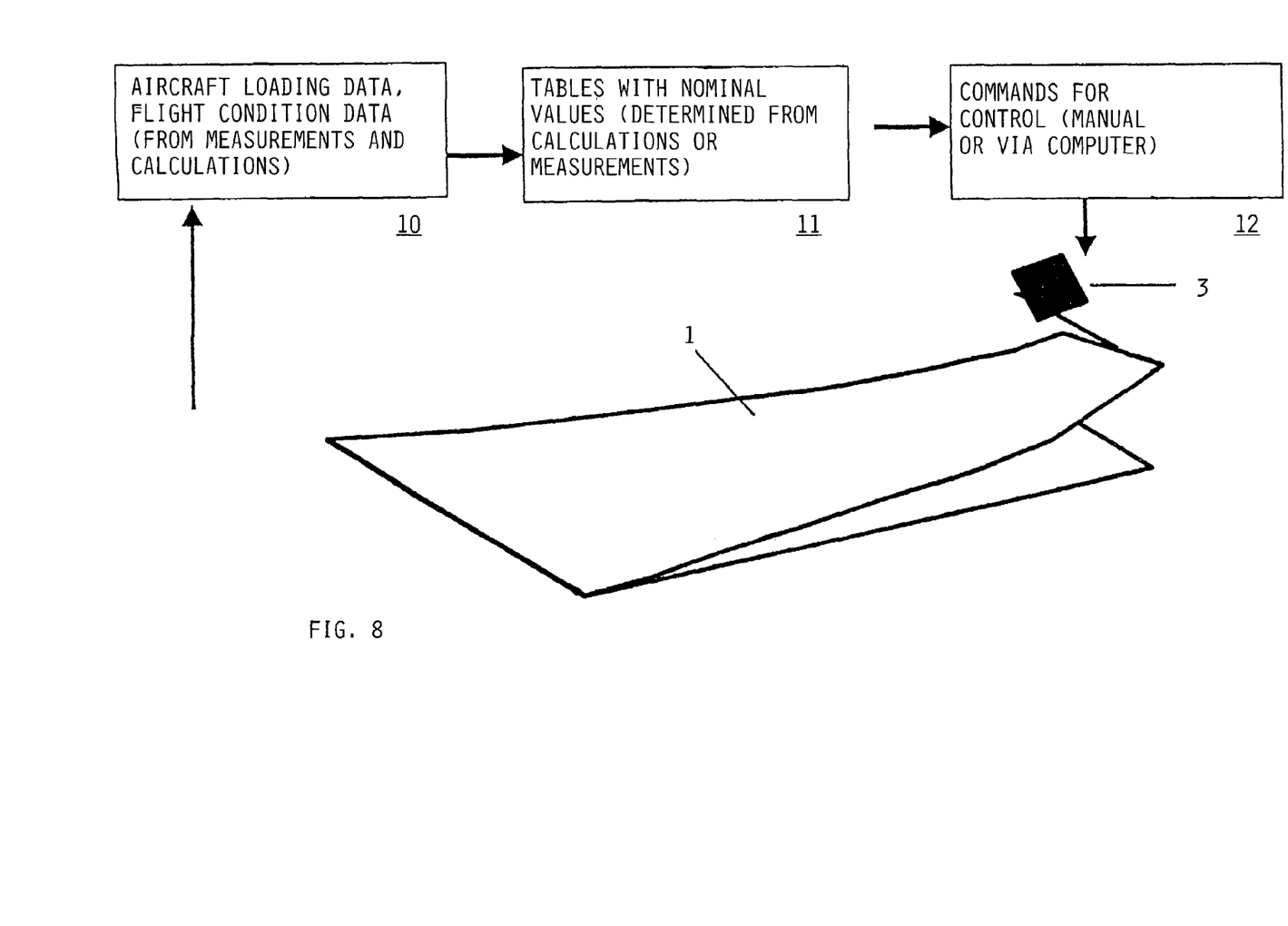
FIG. 8 a diagram, which shows an example embodiment for the control of the deformation of a lifting surface of an aircraft according to example embodiments of the invention.

In a schematic illustration, FIG. 8 shows an example embodiment for the control of the deformation of the surface 1 by a readjustment of the control surface 3. Aircraft loading data and flight condition data 10 are produced from measurements and calculations. From these aircraft loading and flight condition data 10, stored data in the form of tables with desired or nominal values 11 which are determined from calculations or from measurements, are derived, a command 12 for the control of the control surface 3 in the form of an actuating or adjusting signal is derived from these derived nominal value data 11, and with the help of this actuating signal 12 the control surface 3 is adjusted in the sense of a minimization of the induced fluid dynamic drag of the surface 1, as explained initially above.

Figure 9:
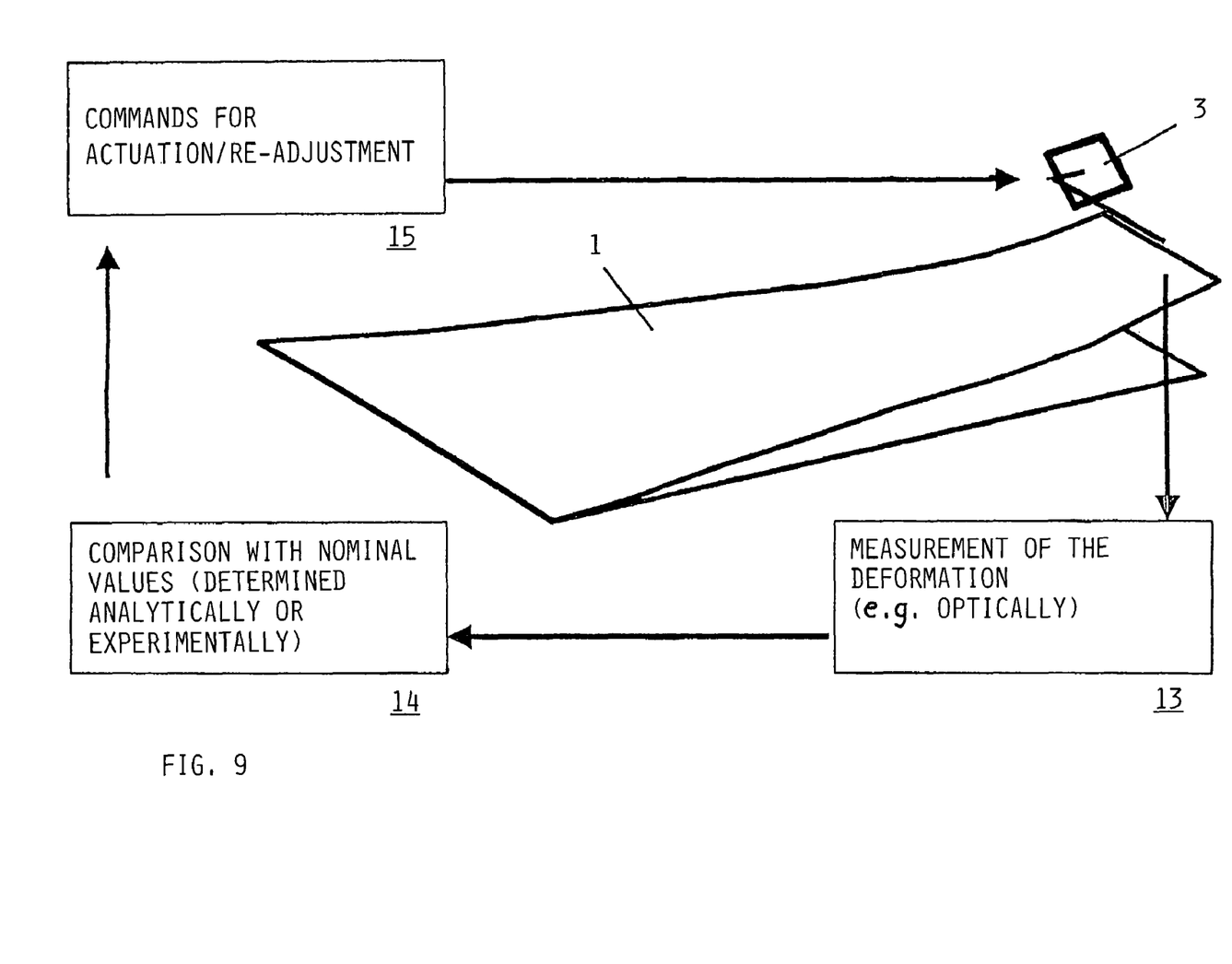
FIG. 9 a diagram, which shows an example embodiment for the regulation of the deformation of the lifting surface of an aircraft according to example embodiments of the invention.

FIG. 9 shows a schematic diagram for the regulation of the deformation of the surface 1 by the control surface 3. The actual deformation of the surface 1 is measured in measurement unit or step 13 for example in an optical manner, and the measured data acquired thereby, which represent the actual deformation of the surface 1, are compared in comparison unit or step 14 with desired or nominal data of a desired or nominal deformation that is optimal in the sense of a minimization of the induced drag for the existing flight condition and the aircraft loading, from this comparison 14 a command for the readjusting of the control surface 3 is produced in command generation unit or step 15 in the form of an actuating signal and is transferred to the control surface 3. Hereby there is achieved an adaptation or matching of the deformation of the surface 1 in the sense of a minimization of the induced fluid dynamic drag of the surface 1, as explained initially above. This is achieved when the measured data representing the actual elastic deformation of the surface 1 correspond with the nominal data representing the desired or nominal deformation prescribed for the aircraft loading and the flight condition.

The principle for a fluid dynamically effective surface of a device moving in a fluid and its elastic deformation for minimizing the induced fluid dynamic drag, described above in connection with a lifting surface of an aircraft, is similarly transferable or applicable to other types of flying machines, such as to rotary wing aircraft, but also basically applies for other types of fluid dynamically effective surfaces of a device moving in a fluid.

The invention claimed is:

1. An aircraft wing arrangement comprising:
    an aircraft lifting wing bounded by a leading edge, a trailing edge and a wingtip edge, wherein said wingtip edge is an outward end edge of said lifting wing, which outward end edge extends from said leading edge to said trailing edge, and wherein said lifting wing is elastically deformable in a bending direction and in a torsional direction about an elastic axis of said lifting wing extending in a span direction outwardly to said wingtip edge between said leading edge and said trailing edge;
    a control surface that is pivotably connected to said lifting wing so as to be pivotable about a rotation axis extending forward of said leading edge and non-perpendicular to said elastic axis and non-parallel to said wingtip edge, wherein said control surface is located offset by a spacing distance in front of said elastic axis, wherein a pivoting deflection of said control surface about said rotation axis is adapted to exert an aerodynamic force that elastically deforms said lifting wing in said bending direction and said torsional direction about said elastic axis and thereby varies an induced drag of said lifting wing during flight of said aircraft, and wherein said control surface is located inwardly from and does not extend outwardly beyond a line extending along said wingtip edge of said lifting wing in all pivoting deflection positions of said control surface about said rotation axis; and a control and/or regulation arrangement adapted to generate an actuating signal according to which said pivoting deflection of said control surface is actuated so as to vary said induced drag toward minimization of said induced drag.

2. The aircraft wing arrangement according to claim 1, wherein said rotation axis extends parallel to said elastic axis, and in front of said elastic axis.

3. The aircraft wing arrangement according to claim 1, wherein said rotation axis is entirely in front of said elastic axis.

4. The aircraft wing arrangement according to claim 3, wherein said rotation axis extends on a line that is non-intersecting with said elastic axis.

5. The aircraft wing arrangement according to claim 1, wherein said rotation axis is entirely in front of said leading edge.

6. The aircraft wing arrangement according to claim 1, wherein said control surface is entirely in front of said leading edge.

7. The aircraft wing arrangement according to claim 1, wherein said control and/or regulation arrangement is adapted to generate said actuating signal so as to achieve an elliptical distribution of lift over said lifting wing.

8. The aircraft wing arrangement according to claim 1, wherein said control and/or regulation arrangement includes a measurement unit adapted to measure an actual elastic deformation of said lifting wing.

9. The aircraft wing arrangement according to claim 1, wherein said control and/or regulation arrangement is a regulation arrangement including a measurement unit adapted to measure an actual elastic deformation of said lifting wing and to produce corresponding measured data, a storage unit that stores desired nominal values representing a desired nominal deformation of said lifting wing prescribed for given aircraft load and aircraft flight conditions, and a comparison unit adapted to compare said measured data with said desired nominal values and to output said actuating signal dependent thereon.

10. The aircraft wing arrangement according to claim 1, wherein said control and/or regulation arrangement is a control arrangement comprising a storage unit that stores desired nominal values, an input connected and adapted to receive aircraft load data and aircraft flight condition data, and an output adapted to output said actuating signal dependent on said desired nominal values, said aircraft load data, and said aircraft flight condition data.

11. A method of varying said induced drag of said lifting wing in said aircraft wing arrangement according to claim 1, said method comprising using said control surface and said control and/or regulation arrangement to carry out the steps:

a) storing desired nominal values;
b) performing measurements and/or calculations to acquire aircraft load data and aircraft flight condition data;
c) producing a control surface actuating signal in consideration of and dependent on said desired nominal values, said aircraft load data and said aircraft flight condition data; and
d) pivotally deflecting said control surface about said rotation axis in accordance with said control surface actuating signal, so that said control surface exerts an aerodynamic force that elastically deforms said lifting wing so as to reduce said induced drag toward a minimum for a given aircraft load and a given aircraft flight condition.

12. The method according to claim 11, wherein said desired nominal values represent a desired nominal deformation of said lifting wing prescribed for said given aircraft load and said given aircraft flight condition, and further comprising measuring an actual elastic deformation of said lifting wing, and producing corresponding measured data further comprising comparing said measured data with said desired nominal values, wherein said producing of said control surface actuating signal is performed in consideration of and dependent on a comparison result of said comparing, and further comprising repeating said steps of said measuring of said actual elastic deformation, said producing of said measured data, said comparing, said producing of said control surface actuating signal, and said deflecting of said control surface until said measured data match said desired nominal values.

13. The aircraft wing arrangement according to claim 1, wherein said control surface is not pivotable about any axis parallel to said wingtip edge, and said control surface is not pivotable about any axis perpendicular to said elastic axis.

14. An aircraft wing arrangement comprising:

an aircraft lifting wing bounded by a leading edge, a trailing edge and a wingtip edge, wherein said wingtip edge is an outward end edge of said lifting wing, which outward end edge extends from said leading edge to said trailing edge, and wherein said lifting wing is elastically deformable in a bending direction and in a torsional direction about an elastic axis of said lifting wing extending in a span direction outwardly to said wingtip edge between said leading edge and said trailing edge;

a control surface that is pivotably connected to said lifting wing so as to be pivotable about a rotation axis extending forward of said leading edge and non-perpendicular to said elastic axis and non-parallel to said wingtip edge, wherein said control surface is located offset by a spacing distance in front of said elastic axis, and wherein a pivoting deflection of said control surface about said rotation axis is adapted to exert an aerodynamic force that elastically deforms said lifting wing in said bending direction and said torsional direction about said elastic axis and thereby varies an induced drag of said lifting wing during flight of said aircraft and wherein said control surface is located inwardly from and does not extend outwardly beyond a line extending along said wingtip edge of said lifting wing in all pivoting deflection positions of said control surface about said rotation axis; and a control and/or regulation arrangement adapted to generate an actuating signal according to which said pivoting deflection of said control surface is actuated so as to influence an actual elastic deformation of said lifting wing to vary said induced drag toward minimization of said induced drag, and wherein said control and/or regulation arrangement includes a measurement unit arranged and adapted to measure said actual elastic deformation of said lifting wing.

15. The aircraft wing arrangement according to claim 14, wherein said control surface is not pivotable about any axis parallel to said wingtip edge, and said control surface is not pivotable about any axis perpendicular to said elastic axis.

16. The aircraft wing arrangement according to claim 14, wherein said measurement unit comprises an optical measuring unit arranged and adapted to optically measure said actual elastic deformation of said lifting wing.

17. The aircraft wing arrangement according to claim 14, wherein said measurement unit is further adapted to produce measured data corresponding to said actual elastic deformation of said lifting wing, and said control and/or regulation arrangement is a regulation arrangement that further comprises a storage unit that stores desired nominal values representing a desired nominal deformation of said lifting wing prescribed for given aircraft load and aircraft flight conditions, and a comparison unit adapted to compare said measured data with said desired nominal values and to output said actuating signal dependent thereon.

* * * * *

UNITED STATES PATENT AND TRADEMARK OFFICE
CERTIFICATE OF CORRECTION

PATENT NO. : 7,597,285 B2  Page 1 of 1
APPLICATION NO. : 10/543037
DATED : October 6, 2009
INVENTOR(S) : Johannes Schweiger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Twenty-eighth Day of September, 2010

David J. Kappos
*Director of the United States Patent and Trademark Office*